US009679558B2

(12) United States Patent
Akbacak et al.

(10) Patent No.: US 9,679,558 B2
(45) Date of Patent: Jun. 13, 2017

(54) LANGUAGE MODELING FOR CONVERSATIONAL UNDERSTANDING DOMAINS USING SEMANTIC WEB RESOURCES

(71) Applicant: Microsoft Corporation, Redmond, WA (US)

(72) Inventors: Murat Akbacak, Burlingame, CA (US); Dilek Z. Hakkani-Tur, Los Altos, CA (US); Gokhan Tur, Los Altos, CA (US); Larry P. Heck, Los Altos, CA (US); Benoit Dumoulin, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 14/278,659

(22) Filed: May 15, 2014

(65) Prior Publication Data

US 2015/0332670 A1    Nov. 19, 2015

(51) Int. Cl.
*G10L 15/22* (2006.01)
*G10L 15/06* (2013.01)
(Continued)

(52) U.S. Cl.
CPC ............ *G10L 15/063* (2013.01); *G06F 17/28* (2013.01); *G06F 17/30654* (2013.01);
(Continued)

(58) Field of Classification Search
CPC ........... G06F 17/27; G06F 17/30; G10L 15/04
See application file for complete search history.

(56) References Cited

U.S. PATENT DOCUMENTS 7,478,038 B2  1/2009  Chelba et al.
8,499,008 B2  7/2013  Pennacchiotti et al.
(Continued)

OTHER PUBLICATIONS

Celikyilmaz, et al., "IsNL? A Discriminative Approach to Detect Natural Language Like Queries for Conversational Understanding", In Annual Conference of the International Speech Communication Association, Aug. 25, 2013, 5 pages.
(Continued)

*Primary Examiner* — David Hudspeth
*Assistant Examiner* — Shreyans Patel
(74) *Attorney, Agent, or Firm* — Shook, Hardy & Bacon L.L.P.

(57) ABSTRACT

Systems and methods are provided for training language models using in-domain-like data collected automatically from one or more data sources. The data sources (such as text data or user-interactional data) are mined for specific types of data, including data related to style, content, and probability of relevance, which are then used for language model training. In one embodiment, a language model is trained from features extracted from a knowledge graph modified into a probabilistic graph, where entity popularities are represented and the popularity information is obtained from data sources related to the knowledge. Embodiments of language models trained from this data are particularly suitable for domain-specific conversational understanding tasks where natural language is used, such as user interaction with a game console or a personal assistant application on personal device.

20 Claims, 6 Drawing Sheets

(51) Int. Cl.
*G06F 17/28* (2006.01)
*G10L 15/18* (2013.01)
*G06F 17/30* (2006.01)
*G10L 15/183* (2013.01)

(52) U.S. Cl.
CPC ........ *G06F 17/30766* (2013.01); *G10L 15/18* (2013.01); *G10L 15/183* (2013.01)

(56) References Cited

U.S. PATENT DOCUMENTS

| | | | |
|---|---|---|---|
| 2007/0255689 A1* | 11/2007 | Sun | G06F 17/30864 |
| 2011/0004462 A1* | 1/2011 | Houghton | G10L 15/183 704/9 |
| 2011/0231347 A1* | 9/2011 | Xu | G06F 17/30864 706/12 |
| 2012/0246176 A1* | 9/2012 | Takamatsu | G06F 17/278 707/749 |
| 2013/0018650 A1 | 1/2013 | Moore et al. | |
| 2015/0331866 A1* | 11/2015 | Shen | G06F 17/30861 707/723 |

OTHER PUBLICATIONS

Hakkani-Tur, et al., "Using a Knowledge Graph and Query Click Logs for Unsupervised Learning of Relation Detection", In IEEE International Conference on Acoustics, Speech and Signal Processing, May 26, 2013, 5 pages.

Li, et al., "Leveraging Multiple Query Logs to Improve Language Models for Spoken Query Recognition", In IEEE International Conference on Acoustics, Speech and Signal Processing, Apr. 19, 2009, 4 pages.

Wang, et al., "Simple and Knowledge-intensive Generative Model for Named Entity Recognition", In Microsoft Research Technical Report, Jan. 4, 2013, 10 pages.

Heck, et al., "Leveraging Knowledge Graphs for Web-Scale Unsupervised Semantic Parsing", In Proceedings of International Speech Communication Association, Aug. 25, 2013, 5 pages.

McGraw, et al., "Automating Crowd-supervised Learning for Spoken Language Systems", In 13th Annual Conference of the International Speech Communication Association, Sep. 9, 2012, 4 pages.

Hakkani-Tur, et al., "A Weakly-Supervised Approach for Discovering New User Intents from Search Query Logs", In Annual Conference of the International Speech Communication Association, Aug. 25, 2013, 5 pages.

Hillard, et al., "Learning Weighted Entity Lists from Web Click Logs for Spoken Language Understanding", In 12th Annual Conference of the International Speech Communication Association, Aug. 27, 2011, 4 pages.

Hakkani-Tur, et al., "Unsupervised Intent and Relation Detection Using Knowledge Graph and Query Click Logs", unfiled US Patent Application.

"Second Written Opinion Issued in PCT Application No. PCT/US2015/031069", Mailed Date: May 11, 2016, 8 Pages.

"International Search Report & Written Opinion Received for PCT Application No. PCT/US2015/031069", Mailed Date: Nov. 2, 2015, 11 Pages.

Heck, et al., "Exploiting the Semantic Web for Unsupervised Spoken Language Understanding", In IEEE Spoken Language Technology Workshop, Dec. 2, 2012, 6 Pages.

"International Preliminary Report on Patentability Issued in PCT Application No. PCT/US2015/031069", Mailed Date: Aug. 5, 2016, 9 Pages.

* cited by examiner

LANGUAGE MODELING FOR CONVERSATIONAL UNDERSTANDING DOMAINS USING SEMANTIC WEB RESOURCES

BACKGROUND

Certain applications and tasks for speech recognition benefit from a conversational level of understanding; for example, tasks involving user interaction with a game console or a personal assistant application on a personal device. Ideally for such tasks, the statistical language models used for speech recognition are trained with text data that is similar to the targeted domain for which the application is built, for example, entertainment search. In particular, the training text data is similar in terms of format and content, such as word sequences containing not only entities but also carrier phrases around the entities, and style, such as natural language word sequences. Such training data may be necessary for training or adapting statistical language models that can be used for real-time speech recognition (e.g., N-gram models or techniques for first-pass decoding).

However, the collection of such training data, even when collected through crowd sourcing, can be expensive and time consuming. Further, existing approaches to train language models using queries (such as all search queries hitting on a certain set of URLs that are expected to represent a target domain or queries that are associated with knowledge graph entities) and entity lists either contain some sort of content-mismatch or style-mismatch, or lack popularity information, and therefore without any data massaging do not satisfy requirements for real-time conversational understanding.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention are directed to systems and methods for training statistical language models using in-domain-like data collected from a plurality of resources. In particular, one or more data resources (such as web documents, query click logs, knowledge graphs or relational graphs, or other semantic web sources) may be mined for specific types of data, which are then used for language model training. As will be further described, in one embodiment, the types of data collected include data related to style, content, and probability of relevance. Embodiments of language models trained from this data are particularly suitable for domain-specific conversational understanding tasks where natural language is used.

Some embodiments of the invention include training a language model with features extracted from a knowledge graph modified into a probabilistic graph, where entity popularities are represented and the popularity information is obtained from web search query logs or other web documents related to the knowledge. In such embodiments, the entity relationships may be directly modeled in the language model. In this way, embodiments of the invention provide a set of resources for language model training that are richer and meet the criteria required for effective language modeling.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
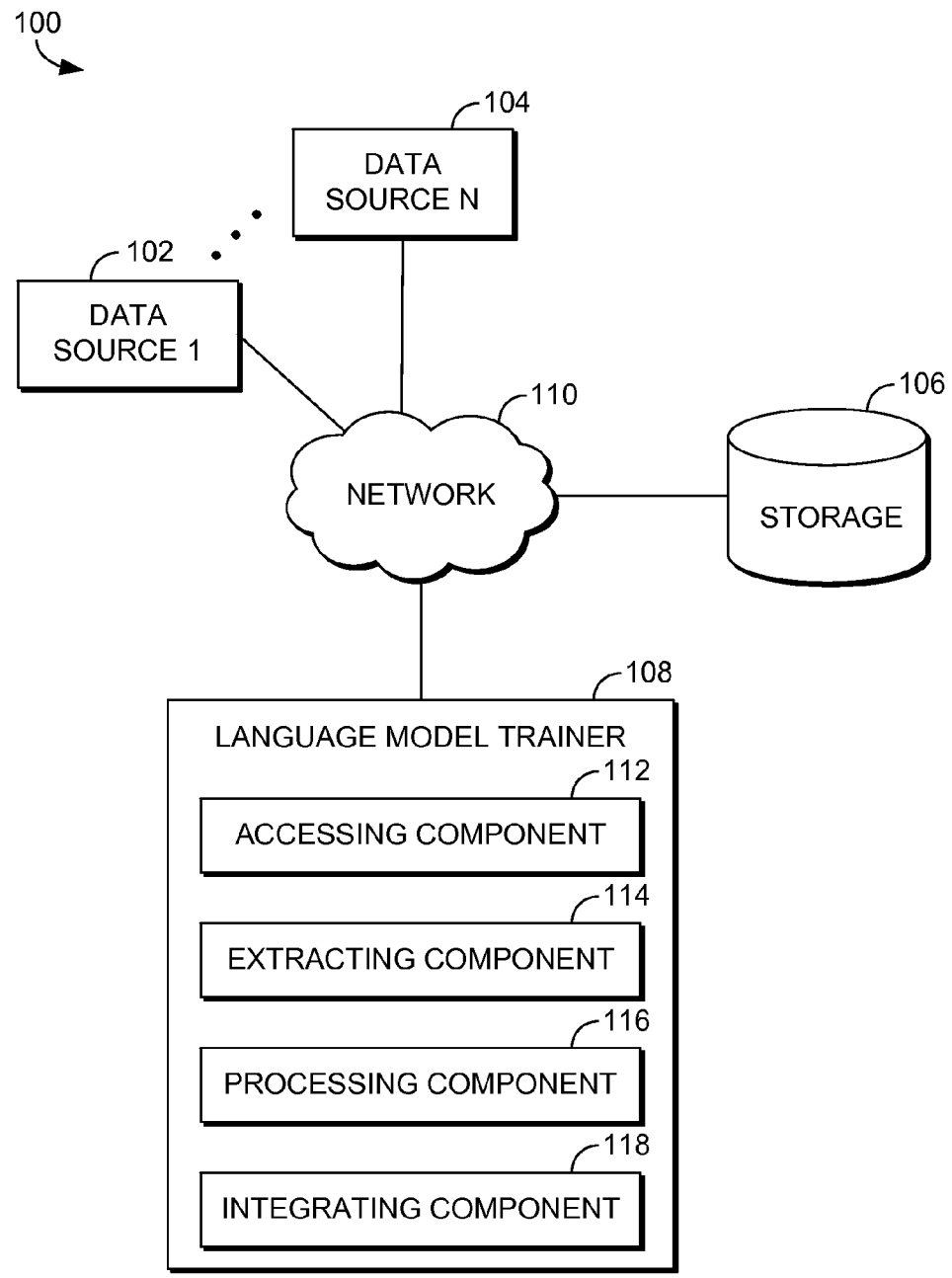
FIG. 1 is a block diagram of an example system architecture in which an embodiment of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer storage media for, among other things, training, including building or adapting, domain-specific language models using in-domain-like data collected from one or more data sources. In particular, the one or more data sources, such as web documents, query click logs, knowledge graphs or relational graphs, or other semantic web knowledge sources, may be mined for specific types of data, which are then used for the language model training. In one embodiment, the types of data collected include data related to style, content, and probability of relevance (statistical data). Embodiments of language models trained from this data are particularly suitable for domain-specific conversational understanding tasks where natural language is used, and also where user queries are around name entities in a specific domain.

At a high level, conversational understanding (CU) systems are typically designed for specific applications and environments, such as a mobile device or home entertainment system. The scope of the target domains of these systems may be defined by back-end functionalities on task specific databases and knowledge bases for these systems. Spoken queries directed to CU systems typically seek an answer to a question or statement, such as "find the movies of a certain genre and director", perform an operation, such as "play a movie", or "reserve a table at a restaurant", or aim to navigate in the dialog, such as "go back to the previous results". The first two types of queries, which are similar to informational and transactional queries of web search, mainly include domain entities, their relations with other entities, or their attributes, all of which are likely to be included in back-end knowledge repositories. These include, for example, the structured semantic knowledge graphs of the emerging Semantic Web, such as Freebase of Bing Satori. Therefore, the populated graphs for various entity types may be used when building class-based language models, where the entity dictionaries can be weighted.

As the ontologies of the Semantic Web can be used to bootstrap ontologies for CU system applications, the populated knowledge in the knowledge graph can be used to mine examples that include surface forms of entities and their relations in natural language. For example, for a pair of related entities, a link of the relation in a knowledge graph may be enhanced with a set of natural language patterns that are commonly used to refer to that relation. Such patterns can be useful to train models for various language processing tasks, such as spoken language understanding (SLU) and for language modeling. Furthermore, such mined data can also be used to extract features that are tuned towards the end task, such as language modeling. Accordingly, in some embodiments, the semantic space for the conversational-system application to be constructed may be defined by the knowledge graph.

By way of background, the Semantic Web can be represented using the Resource Description Framework (RDF), which is a triple-based structure of association that typically includes two entities linked by some relation and is similar to the well-known predicate/argument structure. An example would be "directed_by (Avatar, James Cameron)." As RDFs have increased in use and popularity, triple stores (referred to as knowledge bases or knowledge graphs) covering various domains have emerged, such as Freebase.org.

The semantic ontologies can cover a wide range of queries generated by CU system users. In language modeling, such core entity related information is traditionally captured using class-based language models where class dictionaries are built from the semantic graph. However, these approaches lack the capability to realize the relations between the entities through the natural language queries. Accordingly, some embodiments of the invention go beyond class-based language models to mine the natural language realizations from resources, such as web documents and search query click logs. This mined information may be used to enhance the training data and also to extract features for the language modeling. Mining for patterns from search snippets and web documents, along with query log mining, provides the in-domain-like data used for training the language model. Furthermore, the resulting language model can be interpolated with a language model trained from in-domain data using class-based language models.

Embodiments of the present invention thus address collecting in-domain-like data from one or more resources in an automated way to capture domain semantics and build statistical language models that meet the requirements described above for domain-specific conversational understanding tasks where natural language is used. For instance, a user may give a verbal command to a computing device, verbally communicate a question to a search engine through their mobile device or gaming device, etc.

As previously described, some embodiments of the invention include training a language model with features extracted from a knowledge graph modified into a probabilistic graph, where entity popularities are represented and the popularity information is obtained from web search query logs or other web documents related to the knowledge. For example, in one embodiment a Maximum Entropy model is used where the knowledge graph (or relational graph) provides the input. In such embodiments, the entity relationships may be directly modeled in the language model, which may be used for rescoring purposes during speech recognition decoding. Other techniques may also be used in some embodiments, including continuous-space language models, such as neural network language models (NN-LM) or recurrent neural network (RNN-LM). Further, in some of these embodiments, the models use rich feature sets from the knowledge graphs, such as graph features of specific entities and/or calculated features, such as the domain-relevance of N-grams.

Turning now to FIG. 1, a block diagram is provided showing aspects of an example system architecture suitable for implementing an embodiment of the invention and designated generally as system 100. It should be understood that this and other arrangements described herein are set forth only as examples. Thus, system 100 represents only one example of suitable computing system architectures. Other arrangements and elements (e.g., user devices, data stores, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes network 110 communicatively coupled to one or more data sources, such as Data Source 1 (item 102) and Data Source N (item 104), storage 106, and language model trainer 108. The components shown in FIG. 1 may be implemented using one or more computing devices, such as computing device 600 described in connection to FIG. 6. Network 110 may include, without limitation, one or more local area networks (LANs) and/or wide area networks (WANs). Such networking environments are commonplace in offices, enterprise-wide computer networks, intranets, and the Internet. It should be understood that any number of data sources, language model data stores, and language model trainers may be employed within the system 100 within the scope of the present invention. Each may comprise a single device or multiple devices cooperating in a distributed environment. For instance, the language model trainer 108 may be provided via multiple devices arranged in a distributed environment that collectively provide the functionality described herein. Additionally, other components not shown may also be included within the network environment. For example, a knowledge graph data store may also be provided to separately store knowledge graphs that can easily be accessed by the embodiments described herein.

Figure 2:
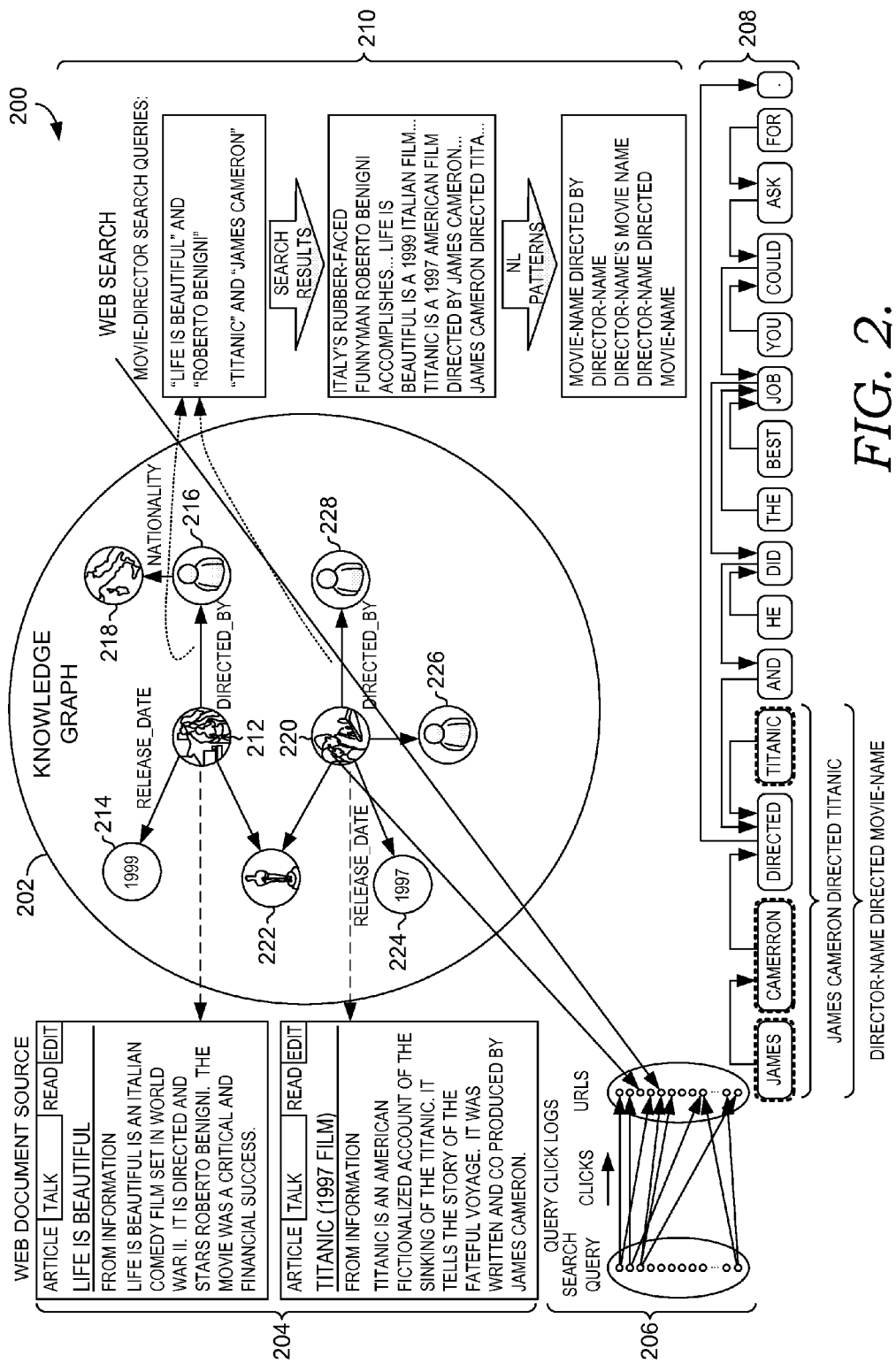
FIG. 2 depicts aspects of an operating environment suitable for practicing an embodiment of the invention.

Example system 100 includes one or more data sources, such as Data Source 1 (item 102) and Data Source N (item 104). (Although FIG. 2 shows a plurality of data sources, as represented by Data Source 1 to Data Source N, it is contemplated that some embodiments use only one data source.) Data sources 102 and 104 comprise data resources from which in-domain-like data is collected, and are intended to include a broad range of different types of data sources. By way of example and not limitation, this includes one or more text sources or user-interactional data sources, such as: web queries; other user-query sources such as customer care systems; knowledge graphs; web documents; catalogs; user feeds; SMS logs; instant messaging logs; e-mail; spoken-word transcripts; other domain-related text sources; user-interaction logs such as tweets, chat or video-call records, user interaction with a web page, search engine or social networking site; multimodal data such as a user clicking a "like" button on a social networking site, purchasing a movie on an online purchasing site, submitting a natural language query to a search engine, and the like; or other sources of data that can be aligned with knowledge in a knowledge graph.

In one instance, the data source identifies at least one entity. As used herein, the term entity is broadly defined to include any type of item that has potential relationships with other items. For example, an entity may include the movie "Life is Beautiful," the director "Roberto Benigni," and the award "Oscar." These three entities are related, in that the movie "Life is Beautiful" is directed by "Roberto Benigni," and the movie also won an Oscar. Multiple entities related in some manner typically comprise a domain, which may be considered as a category of entities, such as movies, exercise, music, sports, etc.

Several examples of data sources 102 and 104 are described in connection to FIG. 2, including query click logs and semantic knowledge graphs (knowledge graphs). Query click logs include data on previously entered search queries and the web pages or URLs that were subsequently selected or clicked on by users based on the particular search query. They are often represented as bipartite graphs (query click graphs) that contain search queries with associated clicked uniform resource locators (URLs) with frequencies of joint occurrence. Knowledge graphs (or relational graphs) are sets of triples indicating a relation between two entities (e.g., Avatar—directed by—James Cameron), which may be compiled into a graph structure.

The in-domain-like data can include style, content, and statistical data, as described below. It is advantageous for all three of these data types to occur in the same data source(s) to be used for improving speech recognition and understanding of natural spoken words. However, in some embodiments, multiple data sources are utilized in order to ensure that all three of style, content, and statistical data are present.

Style data refers to natural language word sequences, such as verbal word sequences that may be uttered by a user. For example, a user may not verbally input "director, Life is Beautiful," but rather simply naturally ask the question "who is the director of Life is Beautiful?" In an embodiment, data sources containing style data may be identified from, for example, mining queries from a search query log, or from mining questions from the web, such as a website that allows users to ask questions and then provides answers or allows other users to provide answers to these questions. Content data refers to word sequences including one or more entities and the carrier phrases surrounding those entities. In an embodiment, content data comprises data that is mined with the guidance of a knowledge graph, such as by searching on pairs of entities or surface forms of entities and their relations in the data source(s).

Statistical data (or probability of relevance data) refers to data that is used to determine the statistical relevance of a particular entity, or the probability that one entity will be spoken by the user over a different entity, among entities in the knowledge graph. In an embodiment, the entity probabilities can be estimated by counting word N-grams in the data sources. Thus, the statistical relevance of an entity is determined based on a popularity of the entity in the identified data sources. Accordingly, the knowledge graph can be converted into a probabilistic graph where entity popularities are represented and the popularity information is obtained from one or more data sources. From this modified knowledge graph, features can be extracted for training the language model. The entity relationships are thus directly modeled in the final language model and can be used for rescoring purposes during speech recognition decoding. Hence, statistical data may be determined by understanding how popular a relationship is between one entity and another. For example, if many users who are asking about the movie "Life is Beautiful" also want to know what is the release date of the movie, then the probability of a user asking about the release date of "Life is Beautiful" may be high.

Continuing with FIG. 1, the data sources 102 or 104 may be identified based on the specific, relevant (in-domain) portion(s) of a knowledge graph. Any data extracted from these identified sources that is relevant to a particular portion of the knowledge graph becomes part of the in-domain data. In one embodiment, each phrase or entity in a data source is given a probability score representing its relevance to the domain, and extracted based on this probability. In some embodiments, domain-relevance scores are determined at the N-gram level. In these embodiments, the count statistics for the N-grams may be weighted based on its domain-relevance score, such as described in connection to method 400 of FIG. 4.

Language model trainer 108 comprises an accessing component 112, an extracting component 114, a processing component 116, and an integrating component 118. The language model trainer 108, in general, is responsible for training language models, including building new language models or adapting existing language models, based on data extracted from one or more data sources.

Accessing component 112 is generally responsible for accessing one or more data sources based on the relevant portion(s) of the knowledge graph and also accessing a knowledge graph for a particular domain. As mentioned, knowledge graphs typically comprise sets of triples (multiple entities and relationships between these entities) for a particular domain. For instance, for the domain "movie titles," the knowledge graph might include tens, hundreds, thousands, hundreds of thousands, etc., of movie titles and other entities related to all or at least a portion of the movie titles. In one embodiment, the knowledge graph stores not only knowledge of the entities and their relationships to one another but also carrier phrases or commonly used word sequences that are associated with the entities. For instance, the commonly used word sequences of "watch," "see," or "play" may be associated with any of the movie titles in the knowledge graph. Thus, in some embodiments, these commonly used word sequences, which may be mined from the one or more data sources, may be added as a new node in the knowledge graph. In an embodiment, data from a data source 102 may be pre-processed prior to its communication and/or integration with the data associated with the accessing component 112.

The extracting component 114 is generally responsible for extracting the relevant style, content, and statistical data from the one or more data sources. In one embodiment, the data may be collected in an automated way, such as by a web crawler, or by a system that is trained to extract relevant data. Data may be automatically extracted, for instance, by finding all documents related to in-domain entities (e.g., via a web search or using URL pointers to web pages in the knowledge graph). Alternatively, queries or documents similar to the documents related to in-domain entities may also be found. Still another way includes identifying user queries and the corresponding URLs clicked on by the users (this may be considered an "in-domain query-URL set"), which may be identified from web search and the knowledge graph, after issuing a query. Further, queries that are similar to those in the knowledge graph can also be automatically collected.

In an embodiment, where in-domain data is not available, in-domain entity lists can be used to model the target domain, which may be used, for example, during data mining from query click graphs. Using this approach, the queries having an entity or entities from the in-domain entity list are mined to identify a list of randomly picked queries to use as a background model. In one embodiment, a metric, such as cross-entropy of clicks, may be used to compare the click distributions of these two query sets in order to determine a domain-specific score for each URL. This information can be used in the iterations on the query click graph, such as described in connection to FIG. 4.

Processing component 116 analyzes the one or more data sources for style, content, and statistical data, in one embodiment, and may further determine the relevance of the data in the one or more data sources to the particular domain. For example, in one embodiment, processing component 116 assigns probability scores to some or all of the entities or phrases in a data source corresponding to their relevance to a portion of the knowledge graph.

Integrating component 118, in one embodiment, integrates data sources and/or integrates the data extracted from the data sources. For instance, style, content, and statistical data extracted from one or more data sources may be integrated by integrating component 118 such that the data can together be used to train a language model for better speech recognition. In one embodiment, processing component 116 also facilitates training the language model.

Storage 106 generally stores collected in-domain data, entity lists, knowledge graphs including modified knowledge graphs, click query graphs, or other data source information, and/or language models, as they are generated or adapted. In some embodiments, a plurality of language models are stored in storage 106 at any one time. For example, more than one language model may be used simultaneously to improve language recognition, such as to accurately determine the possibility of the user's next utterance. Further, although depicted as a single data store component, storage 106 may be embodied as one or more data stores, or may be in the cloud.

Turning now to FIG. 2, aspects of an operating environment suitable for practicing an embodiment of the invention are provided and referred to generally as operating environment 200. Example operating environment 200 includes a portion of a semantic knowledge graph 202 and examples of data sources 204, 206, and 210. The portion of knowledge graph 202 pertains to the movies domain. As described previously, knowledge graphs (also termed semantic or relational graphs) are defined by a schema of triples composed of sets of two nodes and a branch connecting the nodes. In particular, nodes represent entities, while the branch (or arc) represents a relation between the connected entities.

As shown by this portion of the knowledge graph 202, the movie "Life is Beautiful," represented by item 212, was directed by Roberto Benigni, represented by item 216, and was released in 1999, represented by item 214. The relationship between these entities may be described by the following two triples: "Life is Beautiful" "Director" "Roberto Benigni" and "Life is Beautiful" "Release Date" "1999." In addition to these entities, item 218 illustrates the nationality of Roberto Benigni, and item 222 represents an Oscar that the movie won. The portion of the knowledge graph for the movie "Life is Beautiful" is connected to the movie "Titanic," represented by item 220. Related to this movie is the director, item 228, the release date, item 224, and the lead actor of the movie, item 226. Note that because both movies won an Oscar, item 222, both portions of the knowledge graph are connected to this particular node 222.

As described in connection to FIG. 1, one or more data sources may be accessed for collecting in-domain style data, content data, and statistical data. Operating environment 200 includes a number of example data sources including a web document source 204, query click logs 206, and web search 210. Web document source 204 may include web pages that are known to be sources of information for a particular entity (e.g., in-domain sources, such as web pages about a movie, person, place, brand, product, or other entity).

Query click logs 206 include previously entered search queries and the web pages or URLs subsequently selected or clicked on by users based on a particular search query. Large-scale search engines such as Bing or Google log more than 100M queries per day. Each query in these logs has an associated set of URLs that are clicked after the users entered the query. Query click logs are often represented as bipartite graphs, called query click graphs such as item 206, with weighted arcs that map the previously entered search queries to web pages or URLs that were selected by the users. For example, each query, belonging to the set of queries Q, and each URL, belonging to the set of URLs U, is represented as a node. Directed arcs connecting a query $q_i \in Q$ and URL $u_j \in U$ indicate that a user selected $u_j$ based on query $q_i$. Such information not only provides substance or content as to how a user may ask a particular question or make a particular statement but may also assist with analyzing the data to determine probabilities associated with the different entities, which represents an example of statistics data used for training the language models. For instance, many users may ask about the director of a particular movie, and as such, the jump from the movie entity in the knowledge graph to the director entities may have a higher probability of being spoken by a user than some other piece of information in the knowledge graph. Transition probabilities between these two sets of nodes can be computed by normalizing the frequencies of the click events, where $C(q_i, u_j)$ denotes the number of times $u_j$ was clicked on after query $q_i$, was issued. Thus the probability of a user clicking URL $u_j$ from query $q_i$ is given as:

$$P(u_j | q_i) = C(q_i, u_j) \Big/ \sum_{k \in U} C(q_i, u_{jk})$$

Another example data source provided in operating environment 200 is a web search 210. Web searches that are performed for entities in the knowledge graph can provide both style and content data. For instance, using the example knowledge graph 202 of FIG. 2, a first search query may include "Life is Beautiful" and "Roberto Benigni," and a second search may include "Titanic" and "James Cameron." Search results are returned, which may include detailed information regarding each of the search queries, shown in FIG. 2 at item 210. Natural language patterns may then be obtained from these search results, which assist in understanding how a user would naturally speak to ask a question. In particular, a natural language pattern may be "Moviename directed by Director-name," or "Director-name's Movie-name," or even "Director-name directed Moviename." This is also shown by item 208, which illustrates that text from search results may be parsed to extract the natural language patterns, which can then be used for training the language models. These mined patterns may be converted into natural language queries. For instance, "director-name directed movie-name" can be converted into natural language queries such as "who directed movie-name," "who was the director of movie-name," etc.

Figure 3:
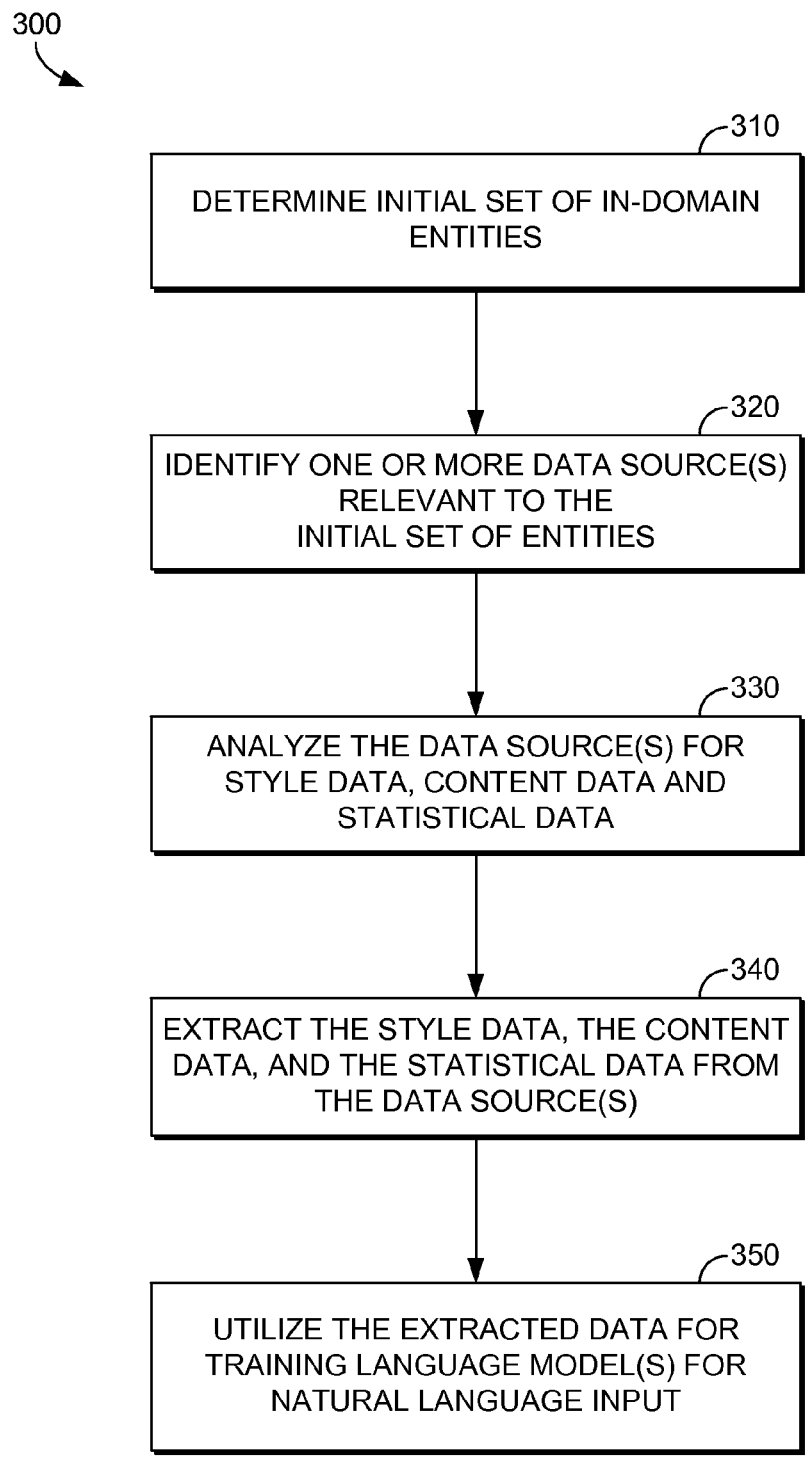
FIGS. 3-5 depict flow diagrams of methods for a training language model using one or more data sources, in accordance with embodiments of the invention.

Turning to FIG. 3, a flow diagram is provided illustrating one exemplary method 300 for a training language model using one or more data sources. As described previously, embodiments of the invention exploit the domain-specific semantic web knowledge sources to bootstrap language models for automatic speech recognition. Example method 300 comprises one embodiment for training language models for CU systems using style, content, and statistics data from one or more data sources.

At step 310, an initial set of entities associated with a target domain is determined. In one embodiment, a portion of a knowledge graph (or relational graph) is accessed, and a set of one or more entities, which may comprise an entity list, is determined that corresponds to the portion of the knowledge graph. For example, the entity list may be determined from entities related to (connected to on the knowledge graph) a seed set of one or more entities. In one embodiment, the entity relations, carrier phrases, and/or other knowledge associated with the initial set of entities on the knowledge graph are also determined. The initial set of entities (and in some instances, their relations and/or associated carrier phrases or other related information) represents the scope of a target domain for training the language model. A particular entity may correspond to a domain; for example, an entity in the restaurant domain may be the name of a specific restaurant, the location of that restaurant, the chef, etc.

At step 320, one or more data sources are identified that are relevant to the initial set of entities. As described in connection to FIGS. 1 and 2, data sources can include text or user-interaction data resources such as query click logs, a web search, user feeds, web documents, multimodal data, etc. In one embodiment, one or more data sources are identified based on a specific, relevant portion(s) of a knowledge graph or entity list. For example, phrases or entities in a data source may be assigned a probability score based on how relevant the phrase or entity is to the target domain. Data sources may then be ranked based on these scores, and the more relevant data sources identified.

In an embodiment, when a data source corresponds to a portion of the knowledge graph, there is knowledge related to the entities in that portion of the knowledge graph. For example, if the portion of the knowledge graph is related to a particular movie, the data or data sources may be web documents about the movie itself, the actors, the directors, the location of the movie, previously entered search queries and selected URLs related to the movie, etc.

In one embodiment, step 320 comprises finding data sources related to the set of in-domain entities, such as via web search, using URL pointers to web pages in the knowledge graph. Alternatively, queries or documents similar to the documents related to in-domain entities, such as may be identified from a knowledge graph, may also be found. One embodiment includes identifying user queries and the corresponding URLs clicked on by the users (this may be considered an "in-domain query-URL set"), which may be identified from a web search and the knowledge graph, after issuing a query. Further, queries that are similar to those in the knowledge graph can also be collected. Where in-domain data is not available, the initial set of entities or the entity list may be used to identify relevant data sources, for example in one embodiment, by data mining from query click graphs. Using this approach, the queries having an entity or entities from the in-domain entity list are mined to identify a list of randomly picked queries to use as a background model. A metric, such as cross-entropy of clicks, may be used to compare the click distributions of these two query sets in order to determine a domain-specific relevance score for each URL.

At step 330, the one or more data sources are analyzed for style data, content data, and statistical data, which may be used to improve language modeling(s) for conversational understanding. Examples of style, content, and statistical data are described in connection to FIG. 1. In one embodiment, the data sources are analyzed for style, content, and statistical data that is relevant to the initial set of in-domain entities identified in step 310. For example, a data source may be analyzed to identify and extract the carrier phrases (representing content data) used in conjunction with a particular entity or related entity pairs in the target domain. As mentioned, it is advantageous for style, content, and statistical data to occur within the same data source(s); but in some embodiments, multiple data sources can be utilized in order to obtain the three data types.

At step 340, the style, content, and statistical data are extracted from the one or more data sources. As described previously, the extracted data that is relevant to a particular portion of the knowledge graph (or entity list or initial set of entities) becomes part of the in-domain data. In one embodiment, phrases or entities in a data source are given a probability score representing its relevance to the domain, and extracted based on this probability. In one embodiment, if one data source is utilized, all of the style, content, and statistical data are extracted from the one data source. However, if that single data source does not contain each of the style, content, and statistical data, other data sources are used to provide this information.

At step 350, the extracted style, content, and statistical data are used for training a language model for natural language input. In one embodiment, statistical data extracted and analyzed from a data source comprises popularity information for a particular entity in the knowledge graph. For example, a first entity may have a higher popularity than a second entity where the first entity appears more often in relation to a third entity than the second entity appears in relation to that third entity. Accordingly, a probability score may be assigned to some or all of the entities in a portion of the knowledge graph. In this way, the knowledge graph is modified into a probabilistic graph, where entity popularities are represented and the popularity information is obtained from web search query logs or other web documents related to the knowledge. Some embodiments of the invention may use other language modeling techniques. For example, in one embodiment, a Maximum Entropy model is used where the modified knowledge graph provides the input, thereby allowing the entity relationships to be directly modeled in the trained language model. In another embodiment, a continuous-space language model is used. Further, as described previously, these models may use rich feature sets from the knowledge graphs, such as graph features of specific entities and/or calculated features, such as the domain-relevance of N-grams, in some embodiments.

Figure 4:
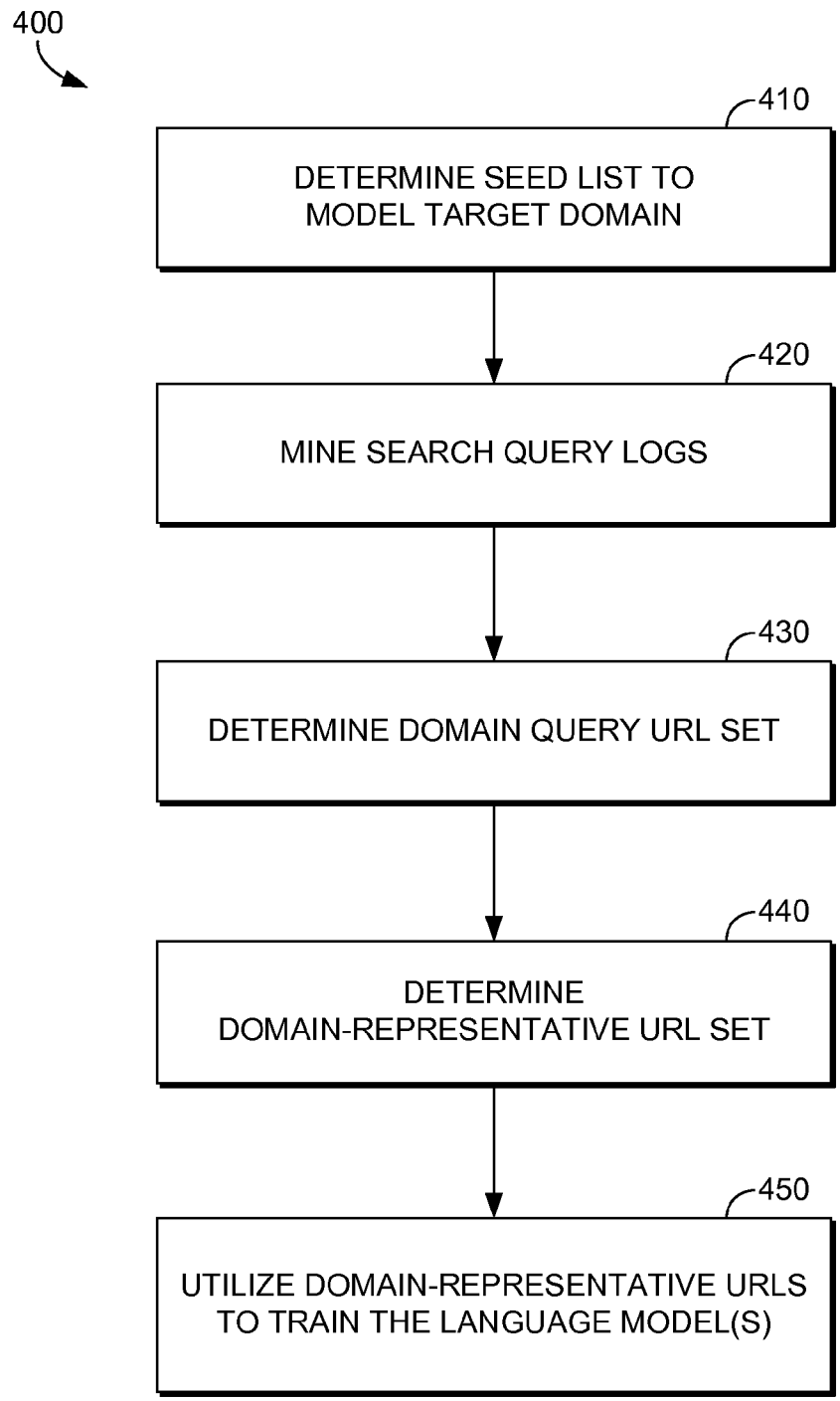

With reference now to FIG. 4, a flow diagram is provided illustrating an exemplary method 400 for training a language model using domain-relevant data from query click logs and knowledge graphs. In this embodiment, a set of URLs identified from the click logs are used to model the target domain by calculating domain representativeness scores for each URL. At step 410, a seed list to model the target domain is determined. In an embodiment, the seed list comprises an entity list from a knowledge graph. Thus the target domain is initially modeled via the entity seed list only. For example, for the movies domain, this seed list may comprise actor/actress names, movie titles, etc. In one embodiment, where in-domain data is limited, all phrases or N-grams of the data (not just the entities) may be analyzed for use to initially model the target domain.

In one embodiment, a probability score is associated with each N-gram in the seed list, which represents how discriminative the N-gram is for the target domain. This may be achieved by a log-likelihood ratio of the N-gram probability calculated from in-domain list versus overall query logs. Application of the probability score results in an initial in-domain N-gram set. In some embodiments, a predetermined threshold can be applied to the in-domain N-gram set to form an in-domain discriminative N-gram set.

At step 420, search query logs are mined to find the queries containing the entities in the seed list. In one embodiment, an exact match is applied between the entity list and query logs in order not to expand too quickly the query set size. In the embodiment where an in-domain discriminative N-gram set is determined at step 410, the query logs that contain those N-grams are mined to form an in-domain initial query set.

At step 430, a domain query URL set is determined. In one embodiment, using a query click graph corresponding to the query log(s), a set of URLs is identified that includes the URLs clicked on when mined queries are issued by web search engine users. In an embodiment, as described in step 440, the domain query URL set will be used to find domain-representative URLs that can be used to walk back (from the URLs to the queries) on query click graphs to identify an expanded set of queries to use for language model training. In one embodiment, at this stage of method 400, both the entity list and URLs can be used to model the target domain.

In the embodiment where an in-domain initial query set is formed, based on the click entropies of these URLs, a threshold may be applied to filter out the noisy queries thereby forming an in-domain discriminative query set. For example, an N-gram click-entropy definition may be used for determining the click entropies. A click query graph may be applied to the in-domain discriminative query set, thereby forming an in-domain query URL set, which is believed to most likely represent a target query.

At step 440, a domain-representative URL set is determined. In one embodiment, this is determined by computing the probability of a click on a particular website ($url_i$) given an entity list. By way of example and not limitation, this may be determined by aggregating the counts of clicks received by the particular website for queries that are coming from the entity list (DomainSeedSet), and then dividing this by the total number of clicks received for all websites in the context of the seed entity list. Accordingly:

$$p(url_i | DomainSeedSet) = \frac{clicks(url_i | DomainSeedSet)}{\Sigma_j(url_j | DomainSeedSet)}$$

where clicks represents the sum of all clicks that a particular website received over all queries in the seed query list. Alternatively, in one embodiment the set of domain-representative URLs may be identified in a more discriminate way, such as by introducing a large set of random queries and calculating a domain representativeness score. For example, the score may be calculated as a log-likelihood ratio between $p(url_i|DomainSeedSet)$ and $p(url_i|RandomQuerySet)$ where $$p(url_i | RandomQuerySet) = \frac{clicks(url_i | RandomQuerySet)}{\Sigma_j(url_j | RandomQuerySet)}$$

and RandomQuerySet is used to create a background model. Thus, instead of using $p(url_i|DomainSeedSet)$ as the domain representativeness score, the log-likelihood ratio:

$$r_{url_i} = \frac{logprob(p(url_i | DomainSeedSet))}{logprob(p(url_i | RandomQuerySet))}$$

is determined for every $url_i$ to determine how well that specific URL represents the target domain.

In the embodiment where an in-domain query URL set is formed, each URL may be associated with a probability score representing how likely that URL represents the domain. Queries that correspond to the URLs having the highest probability scores are then retrieved from the query click logs. At the same time, domain-representative query-URL sets can be identified by iteration. For example, sets of queries can be tagged after each iteration with entity tags or by performing some tokenization (or chunking), such as on commonly used word sequences or patterns, in order to better model the target domain.

In some instances, such as where the initial seed list is large, there can be ambiguous memberships of the same entity occurring in different entity lists used for different domains or categories in the knowledge graph. To address this, one embodiment assigns weights representing the domain representativeness of an entity for each entity in the original entity list. (This is similar to assigning scores to each URL, described above.) The resulting score should be high for entities that have unambiguous membership in the list, indicating a good representative entity of the target domain, and low for entities having ambiguous or incorrect membership. For example, using a movie titles entity list from the Freebase.org knowledge graph, "The Dark Knight" is a phrase that uniquely references a movie and would therefore have a higher score. But the movie titles entity list also contains the title "Hotel" (a small movie from 2003) that has meaning in many other contexts. Accordingly, assigning entity weights thus prunes the original entity list to keep the highly domain representative entities. The log-likelihood ratio may be recalculated as:

$$r_{url_i} = \frac{logprob(p(url_i | PrunedDomainSeedSet))}{logprob(p(url_i | RandomQuerySet))}$$

to obtain more reliable domain representativeness scores for each URL. In one embodiment, a threshold is applied to keep only the top N URLs.

Continuing method 400, at step 450, the domain-representative URLs are utilized to train the language model(s). In one embodiment, at step 450, domain-representativeness scores of the URLs are incorporated into language model interpolation weights. In one embodiment, at step 450, method 400 walks back on the query click graphs (corresponding to the query click logs of step 420) to the query side of the graphs using the domain-representative URL set determined in step 440. The query side is then mined for domain matching queries, which are then used for training domain-specific language model(s). In some embodiments, where walking on the query-click-back-and-forth creates cleaner (less-ambiguous) entity lists, corresponding domain-relevance scores for N-grams are updated. The final updated scores for these N-grams therefore may be used weight the counts during the language model training. In one embodiment, each N-gram instance and URL pair may be weighted with a joint score determined from the domain-relevance scores for each specific N-gram and specific URL. Further, in an embodiment where class-based language models are trained from the mined data, mined text data (e.g., the search queries) containing these less-ambiguous entities can be targeted for the task of entity tagging since the precision of entity tagging will be much higher. In other words, there will be less errors during entity tagging step for the purpose of class-based language model training and resulting language modeling data will be cleaner (i.e., entities are tagged correctly).

Figure 5:
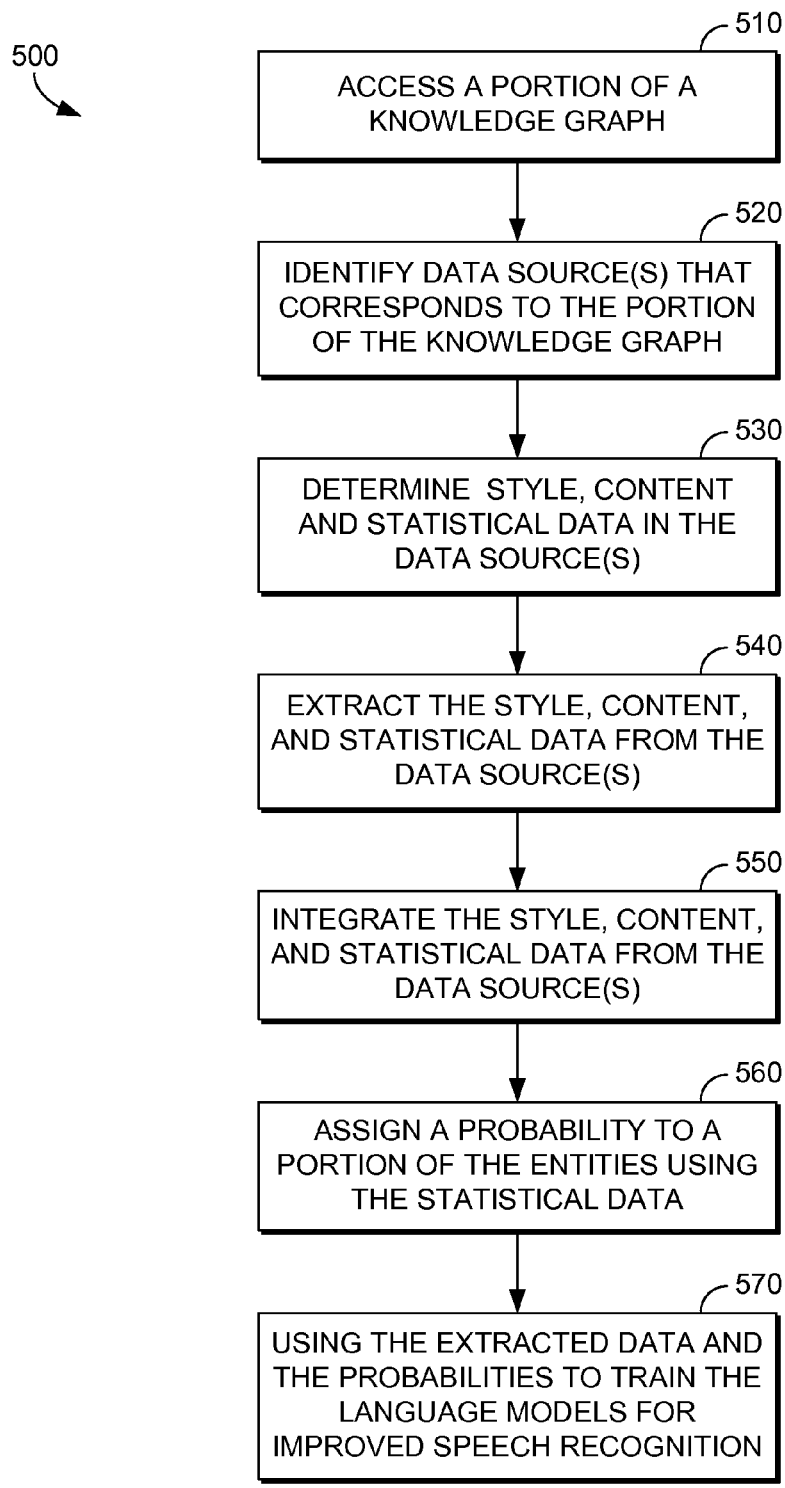

Turning to FIG. 5, a flow diagram is provided illustrating another method 500 for training language model(s) for improved speech recognition using one or more data sources, in accordance with an embodiment of the invention. At step 510, a portion of a knowledge graph is accessed. The portion of the knowledge graph corresponds to a target domain for training a language model and may include one or more related entities and other knowledge associated with the entities.

At step 520, one or more data sources are identified that correspond to the accessed portion of the knowledge graph. In one embodiment, knowledge related to the portion of the graph may be used to identify data sources. For example, if the portion of the knowledge graph is related to a particular movie, then the one or more data sources might include web documents about the movie itself, the actors, the directors, the location of the movie, previously entered search queries and selected URLs related to the movie, and the like.

At step 530, style, content, and statistical data are determined in the one or more data sources determined in step 520. Examples of style, content, and statistical data are described in connection to FIG. 1. In one embodiment, the data sources are analyzed to identify style, content, and statistical data that is relevant to the portion of the knowledge graph. For example, a data source may be analyzed to identify and extract the carrier phrases (representing content data) used in conjunction with related entity pairs occurring at the portion of the knowledge graph. As mentioned, it is advantageous for style, content, and statistical data to occur within the same data source(s); but in some embodiments, multiple data sources can be utilized in order to obtain the three data types.

At step 540, the style, content, and statistical data are extracted from the one or more data sources. Embodiments of step 540 are similar to step 340 of method 300, described in connection to FIG. 3.

At step 550, the extracted style, content, and statistical data are integrated into (or otherwise associated with) the knowledge graph such that the extracted data becomes part of the in-domain data. In one embodiment, the style, content, and statistical data are integrated so that it can then be utilized to update or improve the domain-specific language models. For instance, content data may be extracted from multiple data sources for the same portion of a knowledge graph. This data may be compared and combined so that it can efficiently be used to train the language models.

At step 560, utilizing the statistical data, a probability is assigned to at least a portion of the entities corresponding to the accessed portion of the knowledge graph. In one embodiment, the probability corresponds to an entity popularity representing the quantity of instances that the entity appears in the extracted data. Thus the portion of the knowledge graph is modified into a probabilistic graph, where entity popularities are represented and the popularity information is obtained from one or more data sources.

At step 570, the style, content, and statistical data associated with the entities of the portion of the knowledge graph, including the probabilities, are used to train domain-specific language model(s) for improved speech recognition. In one embodiment, step 570 is similar to step 350 of method 300, described in connection to FIG. 3.

Accordingly, we have described various aspects of technology directed to systems and methods for training language models using in-domain-like data from one or more data sources. The language models trained from this data, including style, content, and statistical data as discussed in the embodiments provided herein, are particularly suitable for domain-specific conversational understanding tasks where natural language is used. These embodiments thus provide a set of resources for language model training that are richer and meet the criteria required for effective real-time speech recognition.

It is understood that various features, sub-combinations and modifications of the embodiments described herein are of utility and may be employed in other embodiments without reference to other features or sub-combinations. Moreover, the order and sequences of steps shown in the example methods 300, 400, and 500 are not meant to limit the scope of the present invention in any way and, in fact, the steps may occur in a variety of different sequences within embodiments hereof. Such variations and combinations thereof are also contemplated to be within the scope of embodiments of the invention. For example, the query-log mining described in connection to method 400 may be utilized in other methods, such as where one of the data sources is a query click log. Similarly, embodiments described herein as using only one or two data sources, may use N data sources.

Figure 6:
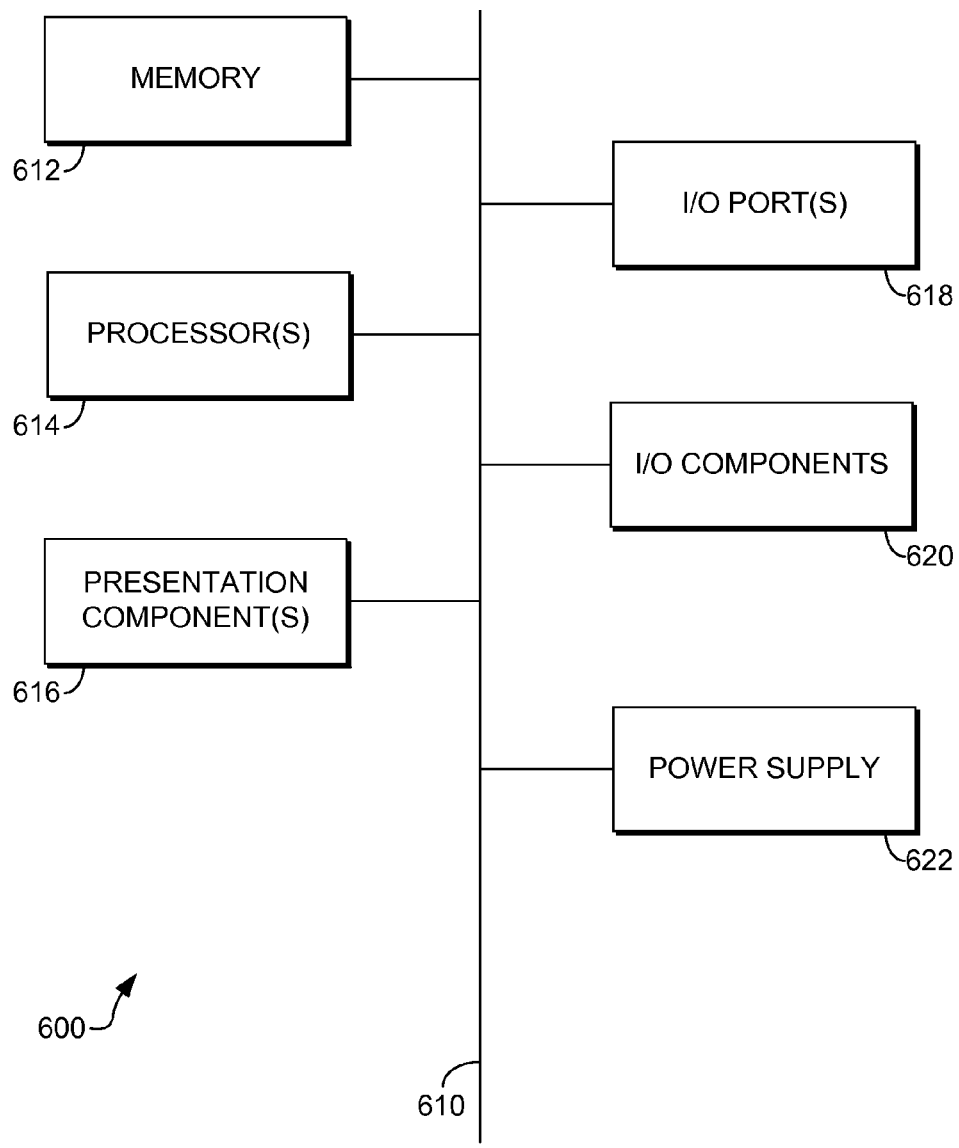
FIG. 6 is a block diagram of an exemplary computing environment suitable for use in implementing embodiments of the present invention.

Having described various embodiments of the invention, an exemplary computing environment suitable for implementing embodiments of the invention is now described. With reference to FIG. 6, an exemplary computing device is provided and referred to generally as computing device 600. The computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

Accordingly, in one aspect, an embodiment of the invention is directed to one or more computer-readable media having computer-executable instructions embodied thereon that, when executed by a computing system having a processor and memory, cause the computing system to perform a method for training a language model using style, content, and statistical data from one or more data sources. The method includes determining a set of in-domain entities, identifying one or more data sources relevant to the initial set of entities, and analyzing the one or more data sources for style data, content data and statistical data. The method also includes extracting the style data, the content data, and the statistical data from the one or more data sources and utilizing the style data, the content data, and the statistical data from the one or more data sources to train the language models for the natural language input.

In another aspect, one or more computer-readable media having computer-executable instructions embodied thereon are provided that, when executed by a computing system having a processor and memory, cause the computing system to perform a method for training a language model for a target domain using domain-relevant data from query click logs and knowledge graphs. The method includes determining a seed list to model a target domain, the seed list comprising one or more entities, and mining one or more search query logs for queries containing at least one entity in the seed list, thereby forming a set of in-domain queries. The method further includes determining a domain query URL set, based on the in-domain queries, and based on the domain query URL set, determining a domain-representative URL set.

In yet another aspect, an embodiment of the invention is directed to one or more computer-readable media having computer-executable instructions embodied thereon that, when executed by a computing system having a processor and memory, cause the computing system to perform a method for training a language model for a target domain using style, content, and statistical data from one or more data sources. The method includes accessing a portion of a knowledge graph corresponding to a target domain, the portion of the knowledge graph further corresponding to one or more entities, and identifying the one or more data sources that correspond to the portion of the knowledge graph. The method also includes determining style data, content data, and statistical data in the one or more data sources, extracting the style data, the content data, and the statistical data from the one or more data sources, and integrating the style data, the content data, and the statistical data extracted from the one or more data sources. The method further includes assigning a probability to at least a portion of one or more entities corresponding to the portion of the knowledge graph, based on the statistical data; and utilizing the style data, the content data, and the assigned probabilities to train the language models for the conversational language input.

What is claimed is:

1. One or more computer storage media having computer-executable instructions embodied thereon that, when executed by a computing system having a processor and memory, cause the computing system to perform a method for training a language model using style, content, and statistical data from one or more data sources, the method comprising:
    accessing a knowledge graph that defines entities within one or more domains,
    determining, from the knowledge graph, a set of in-domain entities that are defined by a portion of the knowledge graph as being within a target domain, wherein the target domain corresponds to a category of entities;
    identifying one or more data sources relevant to the set of in-domain entities;
    analyzing the one or more data sources for style data, content data and statistical data;
    extracting the style data, the content data, and the statistical data from the one or more data sources;
    assigning a probability to at least a portion of one or more entities corresponding to the portion of the knowledge graph, based on the statistical data;
    utilizing the style data, the content data, and the statistical data from the one or more data sources to train the language model for the natural language input, thereby forming an improved language model; and
    utilizing the improved language model for automatic language recognition, conversational understanding (CU), or spoken language understanding (SLU).

2. The one or more computer storage media of claim 1, wherein the set of in-domain entities is determined from a portion of the knowledge graph corresponding to the target domain.

3. The one or more computer storage media of claim 1, wherein the one or more data sources include a query click log, a web document, a user feed, a web search, a multi-modal data source, or user-interactional data source; and wherein the user-interactional data source includes information derived from user-interactions with a user device, application, or online service.

4. The one or more computer storage media of claim 1, wherein style data comprises sequences of words used in natural language.

5. The one or more computer storage media of claim 1, wherein the content data comprises word sequences that include at least one entity of the set of in-domain entities and at least one carrier phrase surrounding the at least one entity.

6. The one or more computer storage media of claim 1, wherein the statistical data is determined based on a popularity analysis of related entity pairs in the one or more data sources.

7. The one or more computer storage media of claim 1, wherein the one or more data sources comprise a first data source, and wherein the style data, the content data, and the statistical data are all extracted from the first data source.

8. The one or more computer storage media of claim 1, wherein the one or more data sources comprise a first data source and a second data source, and wherein the style data, the content data, and the statistical data are all extracted from a combination of the first data source and the second data source.

9. One or more computer storage media having computer-executable instructions embodied thereon that, when executed by a computing system having a processor and memory, cause the computing system to perform a method for training a language model for a target domain using domain-relevant data from query click logs and knowledge graphs, the method comprising:
    accessing a knowledge graph, wherein a portion of the knowledge graph corresponds to one or more entities which correspond to a target domain;
    determining, from the portion of the knowledge graph, a seed list that models the target domain, the seed list comprising one or more entities that are within the target domain;
    based on the seed list, mining one or more search query logs for queries containing at least one entity in the seed list, thereby forming a set of in-domain queries for the target domain;
    determining a domain query URL set for the target domain, based on the in-domain queries;
    assigning a probability score to at least a portion of URLs in the domain query URL set;
    based on the domain query URL set, determining a domain-representative URL set that is determined to represent the target domain;
    utilizing one or more URLs from the domain-representative URL set, and the assigned probability scores, to train a language model, thereby forming an improved language model; and
    utilizing the improved language model for automatic language recognition, conversational understanding (CU), or spoken language understanding (SLU).

10. The one or more computer storage media of claim 9, wherein the domain query URL set includes at least one clicked-on URL corresponding to a query in the set of in-domain queries.

11. The one or more computer storage media of claim 9, wherein the domain-representative URL set is determined based on calculating a probability of a click on each URL in the domain-representative URL set, from queries based on the entity seed list.

12. The one or more computer storage media of claim 9, wherein the probability score indicates how likely the URL represents the target domain.

13. The one or more computer storage media of claim 9, wherein utilizing one or more URLs from the domain-representative URL set to train a language model comprises mining a query click log for queries corresponding to URLs in the domain-representative URL set.

14. A computerized system for training a language model for a target domain using style, content, and statistical data from one or more data sources comprising:
one or more computer processors;
computer memory storing computer-useable instructions that, when used by the one or more computer processors, cause the one or more computer processors to perform operations comprising:
accessing a portion of a knowledge graph corresponding to the target domain, wherein the target domain corresponds to a category of entities, the portion of the knowledge graph further corresponding to one or more entities in the target domain;
identifying the one or more data sources that correspond to the portion of the knowledge graph and the targeted domain;
determining style data, content data, and statistical data in the one or more data sources;
extracting the style data, the content data, and the statistical data from the one or more data sources;
integrating the style data, the content data, and the statistical data extracted from the one or more data sources;
assigning a probability to at least a portion of one or more entities corresponding to the portion of the knowledge graph, based on the statistical data; and
utilizing the style data, the content data, and the assigned probabilities to train the language model for the conversational language input, thereby forming an improved language model; and
utilizing the improved language model for automatic language recognition, conversational understanding (CU), or spoken language understanding (SLU).

15. The computerized system of claim 14, wherein assigning a probability to at least the portion of the one or more entities further comprises analyzing a popularity of the portion of the one or more entities in the data extracted from the one or more data sources.

16. The computerized system of claim 15, wherein the popularity of the portion of the one or more entities corresponds to a quantity of instances that the entities appear in the extracted data.

17. The computerized system of claim 14, wherein style data comprises sequences of words used in natural language, and content data comprises word sequences that include at least one entity of the one or more entities corresponding to the portion of the knowledge graph, and at least one carrier phrase surrounding the at least one entity.

18. The computerized system of claim 14, wherein the one or more data sources include a query click log, a web document, a user feed, a web search, a multimodal data source, or user-interactional data source.

19. The computerized system of claim 18, wherein the user-interactional data source includes information derived from user-interactions with a user device, application, or online service.

20. The computerized system of claim 14, wherein the one or more data sources comprise a first data source and a second data source, and wherein the style data, the content data, and the statistical data are all extracted from a combination of the first data source and the second data source.

* * * * *